United States Patent [19]
Perry

[11] Patent Number: 5,961,133
[45] Date of Patent: Oct. 5, 1999

[54] NESTABLE SHOPPING CART WITH SAFE CHILD SEAT

[76] Inventor: Michael L. Perry, 1500 Burnett Rd., Wilmington, N.C. 28409

[21] Appl. No.: 09/033,115
[22] Filed: Mar. 2, 1998
[51] Int. Cl.[6] .................................................. B62B 39/00
[52] U.S. Cl. ................................ 280/33.993; 280/33.991
[58] Field of Search ........................ 280/33.991, 33.992, 280/33.993, 33.996; 220/334; 292/DIG. 29

[56] References Cited

U.S. PATENT DOCUMENTS

| 3,446,315 | 5/1969 | Close . | |
|---|---|---|---|
| 4,116,456 | 9/1978 | Stover et al. . | |
| 5,211,410 | 5/1993 | Trubiano | 280/33.993 |
| 5,277,473 | 1/1994 | Kelly et al. | 280/33.993 |
| 5,641,200 | 6/1997 | Howell . | |
| 5,651,557 | 7/1997 | DeStefano . | |

Primary Examiner—Richard M. Camby

[57] ABSTRACT

The present invention is a shopping cart which utilizes a conventional trapezoidal-shaped basket mounted in a cantilevered fashion to a wheeled undercarriage. The large end of the basket is the front of the shopping car and has a gate which rotates to provide a means of nesting with other carts of a similar design. An inherently-safer child seat is provided which is located at the narrow, rear end of the basket, and the bottom of the child seat coincides with the bottom of the basket. The child seat is surrounded on three sides by high walls, which prevent a small child located in the child seat from leaning out over the sides of the shopping cart and thereby upsetting the balance of the cart, as well as protecting the child from impacts with other objects. The handle of the shopping cart rotates to enable nesting with other carts and to aid in the placement and removal of a child in the child seat provided. Preferably, the child seat is also provided with a harness or a seat belt to help restrain a small child placed in the seat. An optional seat flap enables the child seat to be converted into useful basket space whenever the child seat is not occupied by a child.

19 Claims, 6 Drawing Sheets

NESTABLE SHOPPING CART WITH SAFE CHILD SEAT

FIELD OF INVENTION

This invention relates generally to shopping carts such as those used in supermarkets and the like, and more specifically to an improved shopping cart having a child seat which is substantially safer than those provided by conventional shopping carts in widespread use today.

BACKGROUND OF THE INVENTION

Most grocery stores, supermarkets, and other large retail outlets provide shopping carts for their customers. These shopping carts typically have a seat within the cart which is designed to hold small children, typically children 5 years of age or younger. Such child seats are very convenient for a shopper with a small child, however they are also inherently dangerous due to the high location of the seat. Young children of this age are naturally very active and curious and there are lots of distractions in a store for both the child and the adult who is preoccupied with shopping. Unfortunately, this combination can lead to serious injury to the child if he or she falls out of the child seat. Another potential hazard presented by seating a child in a high location on a cart with a narrow wheel base is that the cart is relatively unstable and can be tipped over rather easily, e.g., by an older sibling hanging onto the side of the cart. Once again, the high location of the child seat also increases the likelihood that a serious injury may result from such a tip over.

The United States Consumer Product Safety Commission (CPSC) has estimated that an average of 20,400 children 5 years old and younger were treated in hospital emergency rooms in the United States each year from 1985 through 1994 for injuries relating to shopping carts [1]. This estimate was based on incidents reported through the National Electronic Surveillance System (NEISS) during this time period, which also showed that the highest number of injuries (56%) associated with shopping carts in this age group was falls. Approximately 75% of the injuries due to falls were cuts, scrapes, and bruises; however, concussions represented about 20% of other injuries and 5% were fractures which required hospitalization. The other major causes of shopping cart-related injuries for this age group identified by the NEISS reports were "contact/run-into carts" (19%) and "tipovers"(8%) [1]. (A separate study concluded that after falls, tipovers are the second most common mechanism of shopping cart-related injuries among children younger than two years of age that were treated in emergency rooms [2].) In both falls and tipovers the risk of serious injury is exacerbated by the relatively high location of the child seat in the conventional shopping cart, i.e., the child has a long distance to fall and the cart is more likely to tip over due to the high center of gravity.

This inherently dangerous situation has been recognized for some time and has been addressed by others. Most of the prior art consists of harnesses and/or collapsible structures that are attached to the existing child seat in a conventional shopping cart (e.g., U.S. Pat. Nos. 4,108,489; 4,204,695; 4,867,464; and 5,641,200). However, all of these proposed solutions require additional equipment that the shopper must: 1) purchase, 2) remember to bring with him or her to the store, 3) learn how to operate, and 4) take the time to use on each visit. Of course, such equipment could also be permanently attached to the carts or loaned by the stores to their customers with small children; but, even if the stores were willing to bear the additional costs of these units and their respective maintenance, the later two problems mentioned above would still present major barriers. Furthermore, it has been shown that even extraordinary efforts to prompt parents to use seat belts in shopping carts have only a modest influence [3]. An "automatic" child restraint has also been proposed in U.S. Pat. No. 5,651,577 by De Stefano, but even the inventor of this device apparently realizes that the costs associated with this equipment will prohibit stores from voluntarily accepting such a solution since he petitioned the CPSC to require all shopping carts with child seats to have such a device. Finally, it should be noted that in all of the above cases, if the equipment fails to prevent a child from falling out of the seat the risk of an injury is still high, nor has the risk of the cart tipping over been adequately addressed.

The existing situation led a group of pediatricians who studied shopping-cart related injuries [4] to the following strong conclusions: "Injuries related to shopping carts are an important cause of pediatric morbidity, especially among children younger than 5 years. These injuries can also result in death. Shopping carts are not designed for the safe transportation of children. Children transported unrestrained in the shopping cart basket can easily fall from the cart. Restraining belts and infant seats will not adequately prevent injuries from cart tip-overs. Therefore, shopping carts should be redesigned to decrease the risk of injury to children, and transportation of children in shopping carts of the current design should be prohibited."

A redesigned shopping cart that is inherently more stable than the conventional design, and which provides a more-secure child seat, could potentially prevent a large number of serious injuries; especially if such a cart did not require any additional preventative actions by the adult guardian. One obvious means of making the conventional cart more stable would be to widen the width of the wheel base; however, this is not a viable option since the retailers who employ such carts would then have to devout a greater percentage of their floor space to empty aisles. A more attractive option would be a shopping cart which provides a child seat in a lower location than the current design. A lower child-seat location would not only lower the center of gravity of the cart, making it more stable, it would also reduce the distance a child would fall if the cart tipped over or if a child fell out of the child seat, thereby greatly reducing the potential for serious injury if either event does occur. However, the design of a shopping cart with a lower child-seat location is not a trivial matter, since a commercially-available shopping cart must also be "nestable", i.e., it must nest with a cart of a similar design so that the carts may be stored in a compact manner when they are not in use. This is an important requirement that must be met in order for the design to be readily accepted by the retailers which utilize such carts. The simple relocation of the child seat to a lower position within the conventional design is incompatible with this requirement. It is not obvious how to reconcile this nesting requirement with a relocation of the child seat.

Therefore, a new and novel shopping-cart design is required in order to provide a nestable cart with a lower, and inherently safer, child seat. On the other hand, if the new design could also nest with existing designs, then there is the added advantage that retailers could replace their older carts in stages. Additionally, the new design should be about as simple to operate and maintain as the conventional shopping cart.

OBJECTS OF THE INVENTION

Accordingly, the principal objective of the present invention is to provide an improved shopping cart with an inherently safer child seat which is also nestable, or capable of being stored with carts of a similar design in a compact manner, when not in use.

Another object of the present invention is to provide a shopping cart that has essentially the same outer dimensions as conventional shopping carts, such that retailers adopting the improved cart will not have to alter store floor plans or cart-storage areas.

Another object of the present invention is to provide a shopping cart that has sufficient basket space for retail items in addition to providing a safe child seat.

Still another object of the present invention is to provide a shopping cart that is simple to operate and inexpensive to manufacture and maintain.

Yet another object of the present invention is to provide a shopping cart that is not only safer for small children because of the relatively low position of the child seat, but also provides a child seat which restrains and protects the child in a secure manner.

Still another object of the present invention is to provide a shopping cart that can optionally nest with shopping carts of a more conventional design.

Further objects and advantages of the invention will become apparent from a consideration of the drawings and ensuing description.

SUMMARY OF THE INVENTION

The present invention utilizes the conventional trapezoidal-shaped basket with sloping sides mounted in a cantilevered fashion on an undercarriage with wheels. The large end of the basket also has a pivoting side for nesting with other carts of a similar design. However, that is where the similarities with the conventional shopping cart end. The conventional design has been essentially rotated 180 degrees, such that the front of the conventional cart has hereby become the rear in this new design. The foregoing objects of the present invention are achieved by providing a child seat which is located in a relatively low position, namely at the level of the basket bottom. One of the unexpected benefits of this unique child-seat location is that the seat is surrounded on three sides by high walls, which prevent a small child placed in the seat from leaning out over the sides of the cart and thereby upsetting the balance of the cart or falling out of the cart, as well as protecting the child from impacts with external objects. The handle of the present cart rotates to enable nesting with other carts and to aid in the placement and removal of a child in the seat provided. Preferably, the child seat is also provided with a harness or a seat belt to restrain a small child placed in the seat. An optional seat flap enables the child seat to be converted into useful basket space for shoppers not accompanied by small children.

This summary is meant to provide a brief overview of the present invention and some of its benefits. The present invention and its significance will be further understood by one skilled in the art from a review of the complete specification, including the drawings and the claims.

REFERENCE NUMERALS IN DRAWINGS

10 shopping cart
20 trapezoidal-shaped basket
21 front/hinged gate
22 narrow/rear end
23 basket bottom
24 basket side walls (2)
25 top crossbar
26 bottom crossbar
27 top rail (2)
28 bottom rail (2)
29 loops or cylinders
40 child seat
42 seat back
43 seat side walls (2)
45 T-shaped crossbar
48 seat-back crossbar
50 seat harness
52 Y-shaped strap
54 adjustable end/buckle
55 buckle receptacle
56 seat flap
58 encased magnets (2)
60 rotating handle
62 handle spars (2)
66 handle gallows (2)
68 handlebar
69 gate cutouts
70 undercarriage frame
72 main member
74 curved uprights
75 undercarriage tray
77 rear-wheel fender/foot rest
80 front wheels or casters (2)
82 rear wheels (2)

DETAILED DESCRIPTION OF INVENTION

Figure 1:
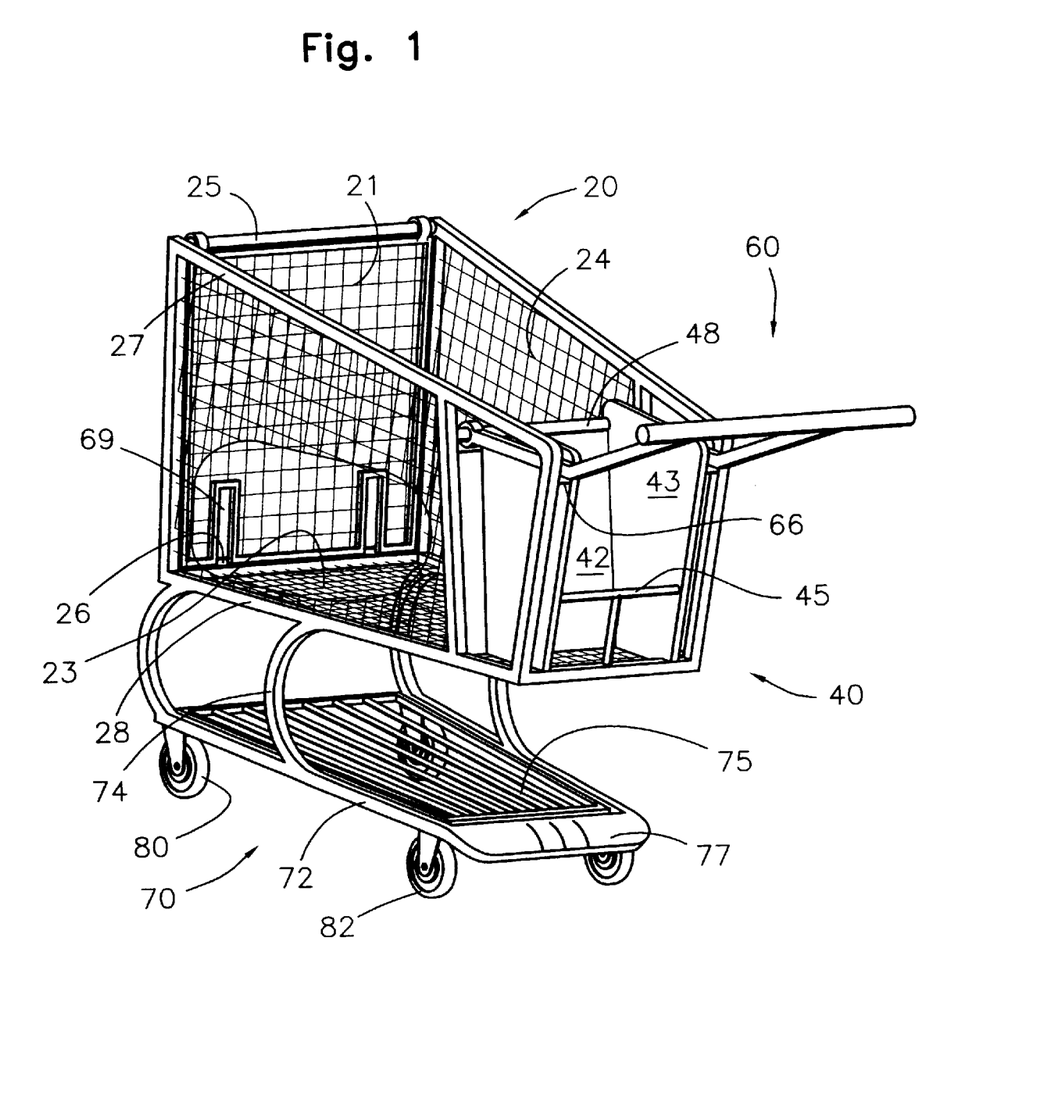
FIG. 1 is an overall perspective view of a shopping cart embodying this invention with the handle shown in the operating, or rear, position.
Figure 2:
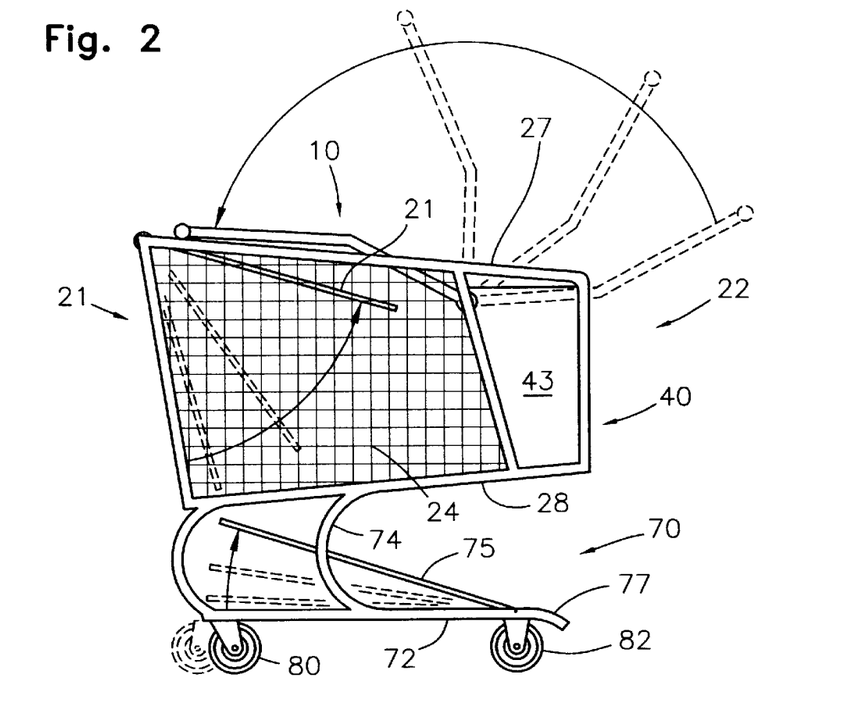
FIG. 2 is a side profile of a shopping cart which also illustrates the motion of four parts: the handle, the front gate of the basket, the undercarriage tray, and the front wheels or casters.
Figure 3:
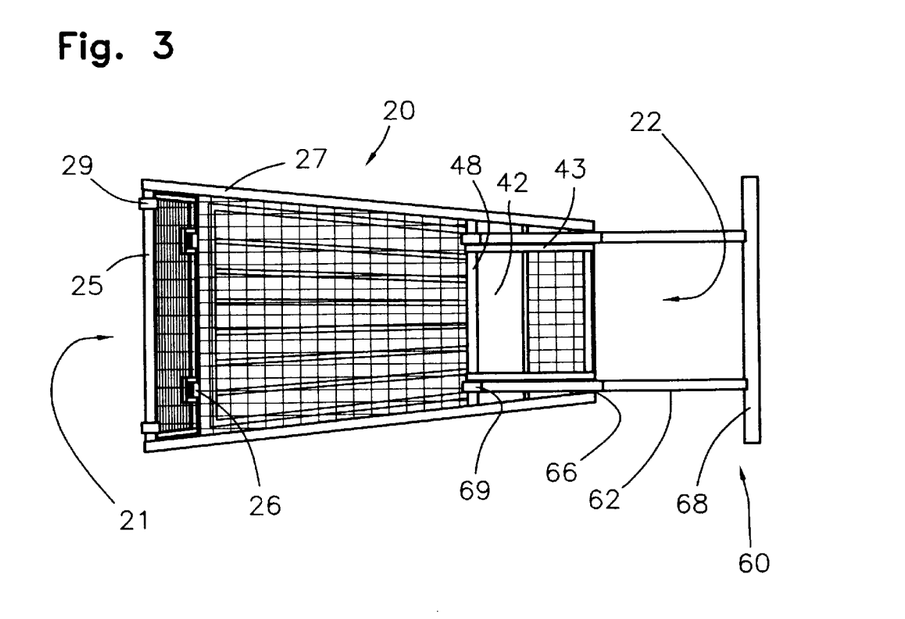
FIG. 3 is a top view of a shopping cart.

Turning now to FIGS. 1 through 3, a shopping cart 10 constitutes a preferred embodiment of this invention. It is readily apparent that the present invention utilizes the conventional type of basket 20 with a trapezoidal-shaped bottom 23 and a hinged gate 21 for nesting with other carts of a similar design. However, unlike the conventional design, the large end of basket 20 is the front end of shopping cart 10 and a rotating handle 60 is located at the narrow end 22 of the basket 20.

The basket 20 has a hinged gate 21 on the front end, two side walls 24, and a bottom 23. The front gate 21 is essentially a side wall which pivots on a top crossbar 25 by means of loops or cylinders 29 with an inner circumference slightly larger than the diameter of the top crossbar 25. The front gate 21 is held in the resting position depicted in FIGS.

1 and 3 by a bottom crossbar 26 which is an integral part of the basket bottom 23 and is preferably slightly thicker than the rest of the bottom 23. The basket bottom 23 is a trapezoid and the basket sides 24 are large at the front end of the basket 20 and smaller near the rear end 22. In addition, the basket bottom 23 is not horizontal, the rear end 22 is slightly elevated relative to the front end of the basket 20. The basket sides 24 are slightly flared outward from the vertical (i.e., the width of the top rails 27 is somewhat wider than the bottom rails 28), this allows the front gate 21 to rotate inside the basket 20. The aforementioned features enable the cart to nest with other carts of a similar design, as will be fully explained in the "Operation of Invention" section. Note that the body (depicted as a mesh in the Figures) of the basket sides 24 do not extend over the entire length of the basket 20; however, the top rails 27 and bottom rails 28, which are an integral part of the basket sides 24, do traverse the entire length of the basket 20.

Located at the rear end 23 of the basket 20 is a rear-facing child seat 40. This child seat 40 is defined by a seat back 42, two side walls 43, and a seat bottom which is simply a portion of the basket bottom 23. An optional T-shaped crossbar 45, which provides two openings for a child's legs as well as structural support for the rear end 22 of the basket 20, has also been depicted in FIG. 1. The seat back 42 is a fixed wall across the width of the basket 20, and is preferably set at a slight angle from the vertical, as shown in FIG. 1, to encourage the child to lean back in the seat 40. The seat back 42 separates the child seat 40 from the main portion of the basket 20. The top of the seat back 42 is preferably attached to the basket side walls 24 by means of a crossbar 48 and the bottom of the seat back 42 is attached directly to the basket bottom 23. Note that the side walls 43 are shown as being separate, and set slightly inboard, from where a continuation of the basket sides 24 would be if these side walls 24 transverse the entire length of the basket 20; the sides of the child seat 40 could also be defined by a portion of the basket side walls 24, however, in the preferred embodiment (shown here) separate side walls 43 are employed for reasons that will become clear in the complete specification.

The seat back 42 should be located close enough to the rear end of the basket 22 so that it will effectively provide a seat that will only accompany small children. The width of the child seat 40 and the optional T-shaped crossbar 45 (if included) will also restrict the size of the child which will fit in the child seat 40. These physical limitations on the size of the child seat 40 are advantageous since they will prevent larger children, who are more likely to tip the cart over, from occupying the child seat 40. The child seat 40 is preferably designed for children between the ages of 7 months and 5 years of age. (Around 7 months, children are capable of sitting while supported and could be placed in the seat. The seat is not designed for infants who cannot sit up while supported, such children should be transported in a backpack or a stroller specifically designed for small infants. It is also important to note that while such a seat may accommodate up to an average 5-year-old child, it may not be able to accommodate larger 4 or 5 year olds. However, children over the age of 3 are generally more likely to walk on their own and obey their guardian's requests while shopping.)

A rotating handle 60 is provided to allow a shopper to push the shopping cart 10 from the rear as well as enable the cart to nest with other carts of a similar design. The rotating handle 60 consists of two handle spars 62 attached to a handlebar 68 at one end of each spar 62. The opposite ends of the handle spars 62 are attached to the seat-back crossbar 48 in a manner which allows the handle 60 to rotate about the crossbar 48. The handle spars 62 are preferably attached to the crossbar 48 at a width a little less than the inside width of the rear end 22 of the basket 20, as clearly shown in FIG. 3. This allows the handle 60 to rest on the gallows 66 (which are best depicted in FIG. 1) provided near the top rear corners of the basket 20 whenever the handle 60 is in the rearward, or operating, position. One should also note that the rotating handle 60 is located primarily outside the confines of the child seat 40, as defined by the side walls 43 and the seat back 42, to reduce the likelihood that the handle 60 will come in contact with a child placed in the child seat 40.

The handlebar 68 is preferably as wide as the front part of the basket 20 to aid the shopper in judging the overall width of the shopping cart 10. This width also provides a convenient method of preventing the handle 60 from rotating into the front of the basket when the handle 60 is in the forward, or storage, position (as is clearly illustrated in FIGS. 4 and 5). The handle spars 62 may be either straight or bent (as depicted in the Figures) depending primarily on where the pivot point of the handle 60 is located. The pivot point is a matter of design and is determined primarily by the weight of the components of the handle 60 and the desired magnitude and direction of force the designer wishes to have to cause rotation of the handle 60. It should be noted that this pivot point could be located anywhere outside the confines of the child seat 40 and is not necessarily restricted to the seat-back crossbar 48. (The handle 60 should preferably be constructed of a strong yet relatively lightweight material, such as a high-impact plastic and/or a fiber-reinforced composite, to limit the force required to rotate the handle 60 and to absorb the impact it will sustain at the end of a rotation.) Two cutouts 69 may optionally be provided near the bottom of the front gate 21. Such cutouts 69 allow the front gate 21 to swing up to a higher position without interfering with the handle 60 when it is in the forward position; this, in turn, will allow the shopping cart 10 to nest in a more compact manner.

The basket is mounted in a cantilevered fashion to an undercarriage frame 70, as shown in FIGS. 1 and 2, which is provided with two front wheels 80 and two rear wheels 82. The undercarriage frame 70 transverses the length of the basket and is flared to essentially match the trapezoidal shape of the basket. The frame 70 is preferably formed from steel members which are welded together. The main member 72 includes the sides and the rear of the frame 70, as well as two upright portions which support the basket. Additional support for the basket 20 are provided by two curved uprights 74 located near the middle of the basket 20. A fender 77 is attached at the rear of the main member 72 to prevent the rear wheels 82 from coming in contact with the either the feet of the shopper pushing the basket or those of a child seated in the child seat 40. For larger children (i.e., 3 to 5 year olds) this fender 77 will ideally serve as a foot rest. The front wheels 80 are attached to the lower portion of the main member 72 and are preferably casters which can rotate freely (as depicted by the dotted fines in FIG. 2) and thereby greatly enhance the maneuverability of the shopping cart 10. The rear wheels 82 are attached on or near the fender 77 and are preferably fixed parallel to the axis of the shopping cart 10. Also shown as part of the undercarriage is an optional tray 75 which rests on the front end of the undercarriage frame 70 and is pivotally attached to the top of the fender 77 at the opposite end. This construction allows the optional tray 75 to rotate up (as depicted by the dotted lines in FIG. 2) and accommodate nesting of another cart of a similar design.

Figure 4:
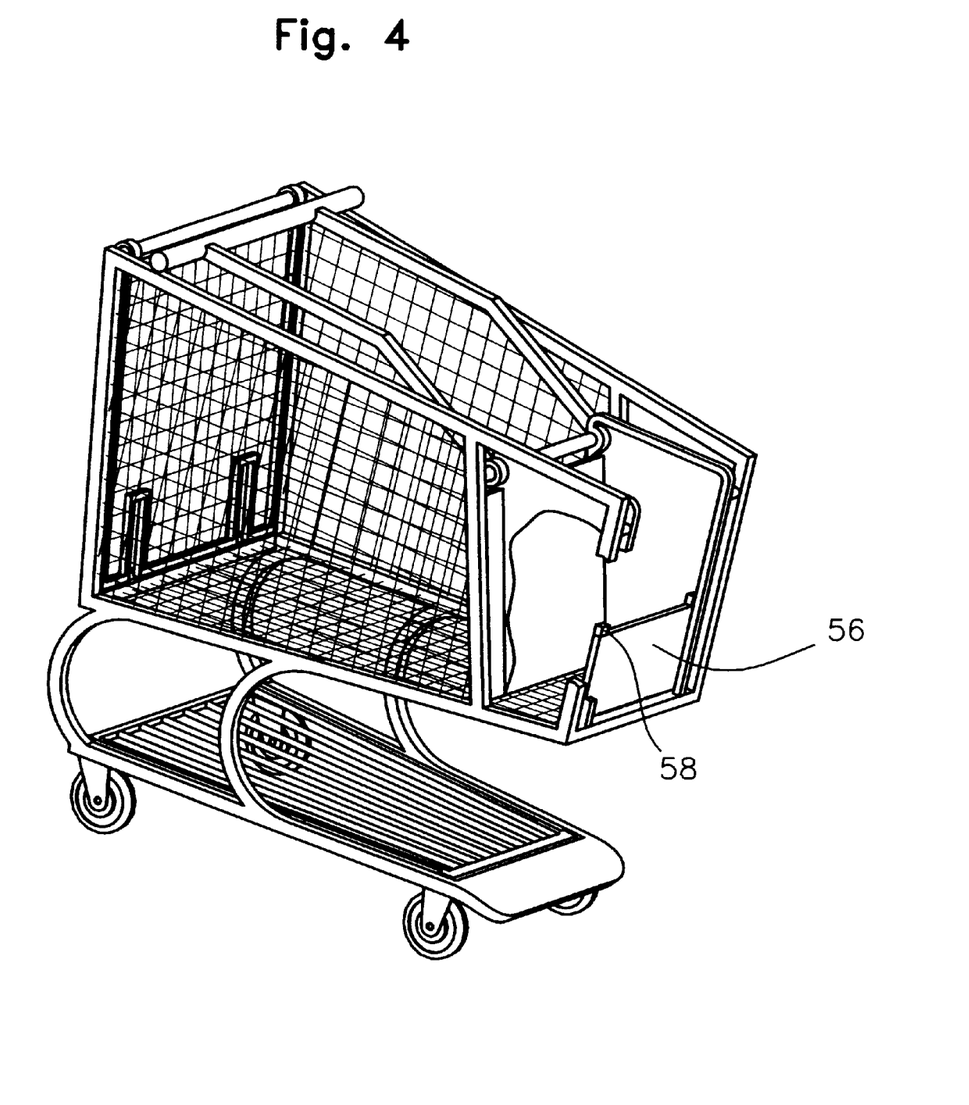
FIG. 4 depicts an alternative embodiment of the child seat which includes a seat flap, as well as showing the handle in the storage, or nested, position.

FIG. 4 depicts an alternative embodiment of the child seat 40, which is identical to those depicted in the previous drawings with the exception that the T-shaped crossbar 45 has been omitted in this drawing and an optional seat flap 56 which rotates on its rear edge is shown. (The seat flap 56 is an option that may be incorporated into either embodiment of the child seat 40, i.e., with or without the crossbar 45.) When the seat flap 56 is in the essentially horizontal position it provides a comfortable seat bottom for a child. In the vertical position the seat flap 56 converts the child seat 40 into useful basket space for carrying items whenever a child is not occupying the child seat 40. The seat flap 56 depicted here is held in the vertical position by a pair of magnets 58 which are encased in the front corners of the flap 56. The flap 56 may also be held in this vertical position by a variety of other means (including springs) which are well known in the art and therefore are not depicted here.

Figure 5:
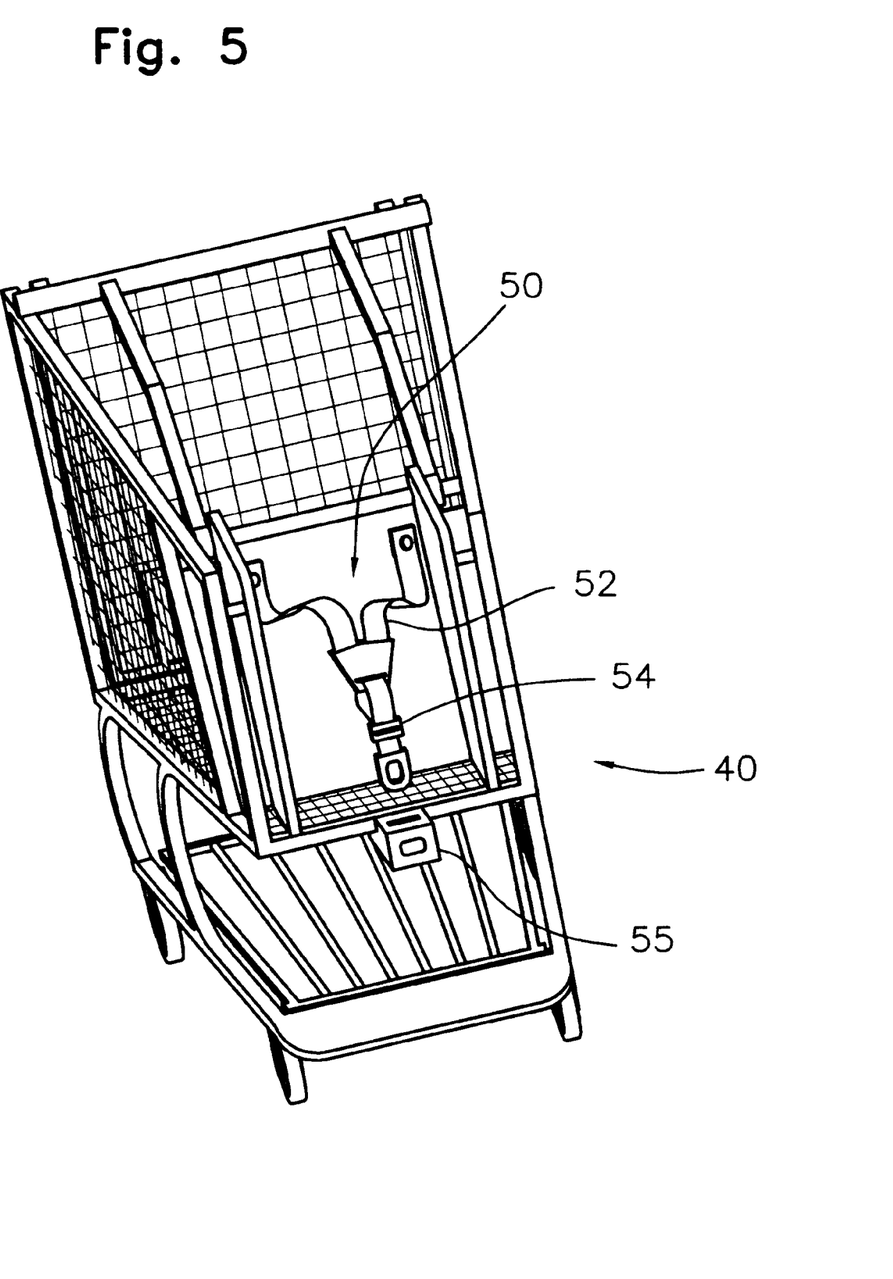
FIG. 5 shows an alternative embodiment of the child seat which includes a harness.

Another alternative embodiment of the child seat 40 is depicted in FIG. 5. A harness 50 is provided, which preferably consists of a Y-shaped strap 52 with an adjustable end/buckle 54, as well as a buckle receptacle 55 located at the center of the basket bottom 23 near the rear end 22 of the basket 20 to allow the end of the harness 50 to be fastened to the bottom of the child seat 40. The top ends of the Y-shaped strap 52 are fixed near the top corners of the seat back 42. The opening in the Y-shaped strap 52 should be large enough to readily accommodate the head of an average 5-year-old. (It should be noted here that the harness could encompass a wide variety of designs, e.g., two adjustable straps with attachments that buckle into a single buckle; but such harnesses and/or seat belts are well known in the art and therefore are not depicted here.) When the strap 52 is placed over the shoulders of a seated child and buckled into the buckle receptacle 55, if the harness 50 is properly adjusted, the child will be secure in the seat and the T-shaped crossbar 45 is no longer required. This particular design embodiment has the advantage that it is easier to place and remove a child in the seat. However, the harness 50 requires particular attention by the child's guardian to ensure that the harness 50 is secure and properly adjusted. Additionally, the harness 50 is more susceptible to damage than the crossbar 45. Of course, the T-shaped crossbar 45 may optionally be supplemented with a harness 50, or just a simple seat belt, to help secure the child in the seat, In any case, if a harness 50 is employed it should be noted that it will provide a substantial degree of security (much like a child's car seat) due to the height of the seat back 42, which provides anchor points for the harness 50 at, or near, the level of the child's shoulders.

OPERATION OF INVENTION

Figure 6:
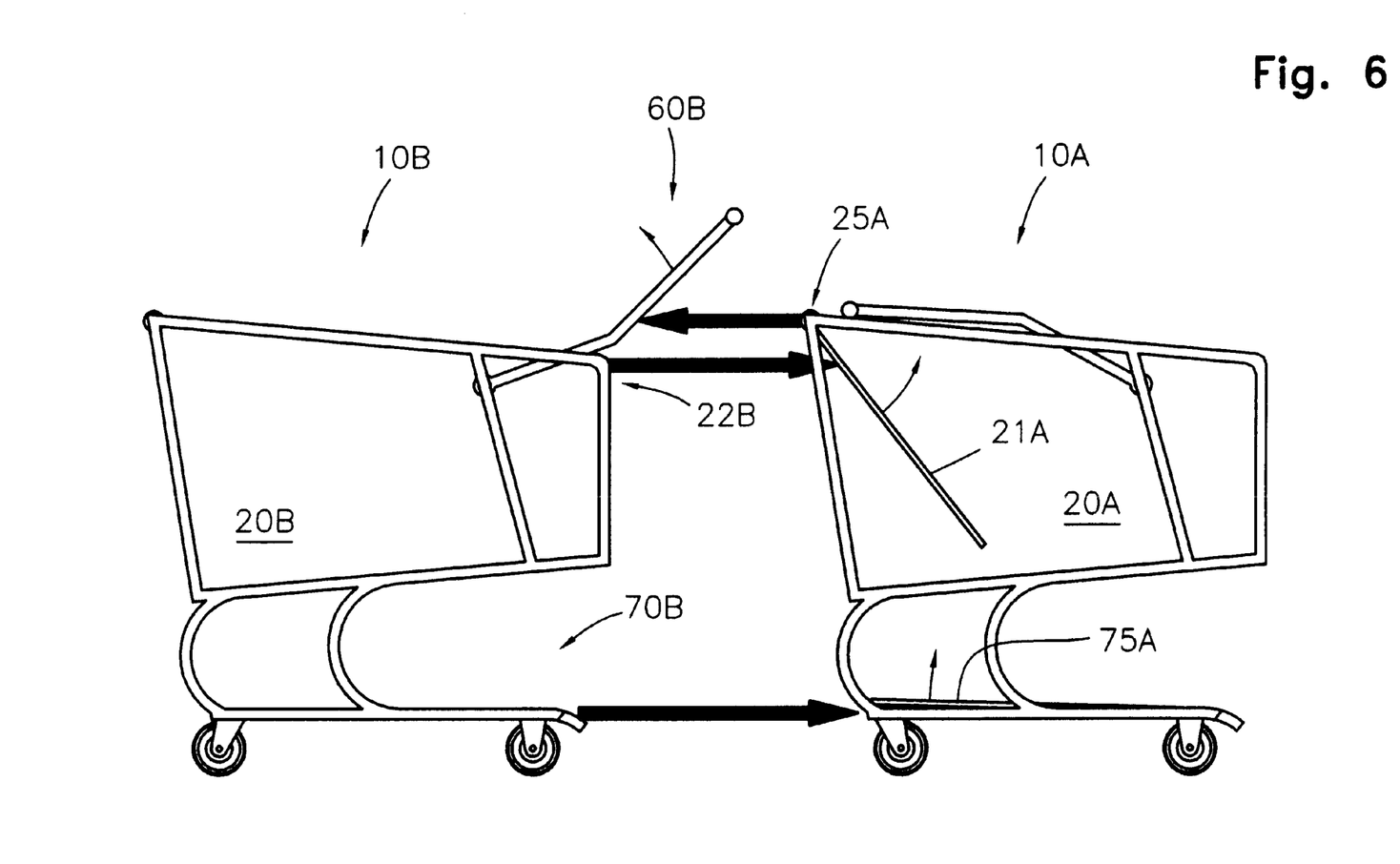
FIG. 6 is a is a schematic illustrating the nesting operation of two shopping carts of the present invention, as well as showing a side profile of the nested conformation of one of the shopping carts.

The operation of the present invention is straightforward, and similar to shopping carts in use today, and therefore the present invention should be readily adapted to by the general public. The shopping cart 10 will nest with other carts of the same design, as illustrated by carts 10A and 10B in FIG. 6. When carts 10A and 10B are pushed together the top crossbar 25A of the rear cart 10A will cause the handle 60B of cart 10B to rotate to its forward resting position on the basket 20B. (Note that cart 10A is depicted with the handle in the forward, resting position, although the handle of this cart 10A may in fact still be in the rear, or operating, position during this operation. Obviously, cart 10A can be pushed a short distance with the handle 60 in either position. The forward handle position is depicted here to help the reader visualize how the carts nest together by showing a profile of the nested conformation.) Simultaneously, the rear end 22B of cart 10B will force the front gate 21A of cart 10A to pivot up and into the rear basket 20A. Similarly, the rear of the undercarriage frame 70B of cart 10B will cause the tray 75A of cart 10A to rotate upward. These three simultaneous motions (depicted by the three arrows in FIG. 6) enable the carts to nest in a relatively compact manner, much like conventional shopping carts. This nesting process can obviously be repeated many times to form large chains of carts for storage purposes and to aid in the transportation of the carts from the parking lot back to the store.

Figure 7:
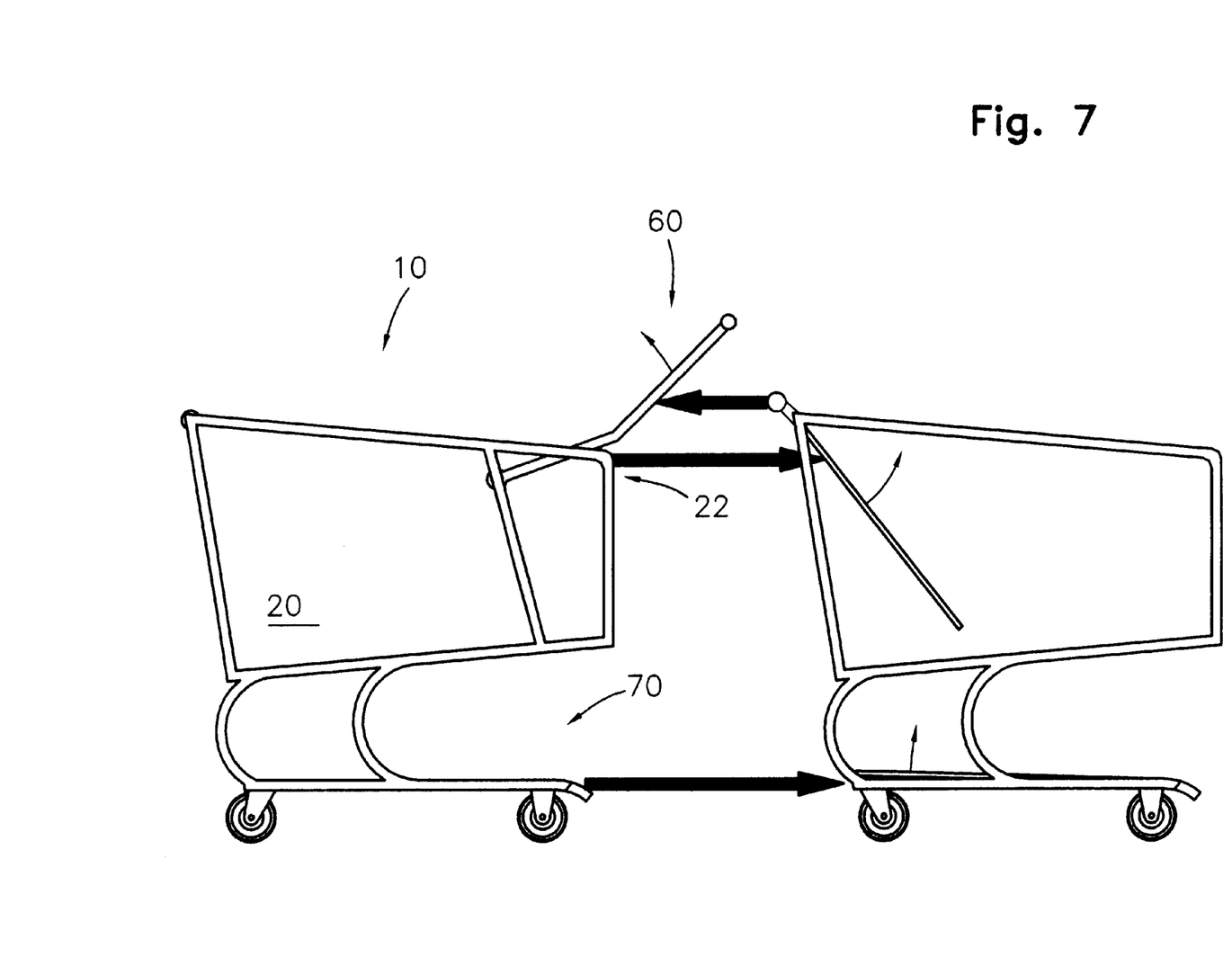
FIG. 7 is a schematic illustrating the nesting operation of a shopping cart of the present invention with a shopping cart of a more conventional design.

FIG. 7 depicts how a shopping cart 10 of the present invention may also nest with a shopping cart of a more conventional design. In the case shown, the same three simultaneous motions described above (and depicted by the three arrows in FIG. 7) enable the carts to nest together providing the overall dimensions of the basket 20 and the undercarriage 70 are essentially identical. (When the positions of the carts is reversed the nesting operation is essentially identical to two conventional carts, which is well known and therefore not depicted here.) The design of the shopping cart 10 may be modified in a variety of ways (e.g., the shape and attachment location of the handle 60 and the inclusion of gate cutouts 69 both have a strong influence on the nesting conformation of the cart 10) in order to make the cart 10 compatible with the fixed handles of conventional shopping carts which are presently in use. It will be appreciated that this compatibility with conventional shopping carts is a very advantageous feature of the present invention, since it potentially offers retailers the possibility of converting to this new design in stages, i.e., a store does not have to replace all of their shopping carts at one time in order to adopt the present invention.

When a shopper desires to use a cart 10 he or she simply pulls on one of the carts at either end of a set of nested carts to separate the desired cart from the rest of the group. If the handle 60 of the cart 10 selected by the shopper has been rotated to the forward position then the shopper should rotate this handle 60 rearward into its normal operating position before going shopping. The shopper can then use the cart in the conventional manner by walking behind the cart 10 and using the handle 60 to push and maneuver the cart 10. If the child seat is not occupied by a small child, then the seat flap 56 (if provided) should be placed (or left) in the vertical position to prevent objects placed in the child seat 40 from falling out, i.e., the seat flap 56 is used to convert the child seat 40 into useful basket space.

If a small child is to be placed in the child seat 40 this should preferably be done with the handle 60 in the forward position. It will be readily appreciated that this forward handle position provides easy access to the child seat 40. (One should also note that an additional advantage of this design is that a small child does not have to be lifted as high as is required in more conventional shopping carts in order to be placed in the child seat 40. In fact, a child may be able to enter and exit the alternative child seats 40 depicted in FIGS. 4 and 5 unassisted by an adult, which is also why a harness 50 or seat belt should be provided when the T-shaped crossbar 45 is omitted.) The seat flap 56 (if provided) should be placed in the horizontal position to provide a solid seat for the child. After placing the child in the seat 40 and securing the seat belt or harness 50 (if provided), the handle 60 should be rotated back in the normal operating position and the cart 10 may then be used as described above. Note that the side walls 43 of the child seat 40 substantially protect the child occupant from coming in contact with the rotating handle 60, however potential "pinch points" do exist near the handle gallows 66 (these points should preferably be labeled accordingly) and special attention should be paid to the position of the child's hands during this moment of the operation. It should be pointed out here that the potential for the hands of a seated child to be pinched during the rest of the operation (i.e., while shopping when the guardian's attention is focused elsewhere) has been greatly reduced by the relatively high side walls 43 which reduce the likelihood that a child's fingers will rest on the top edge of the cart, which is the most susceptible edge to come in contact with external objects (e.g., when the cart is being pulled by through the narrow check-out aisle by a store employee).

It will be appreciated that the present invention is inherently safer than a more conventional shopping cart since it lowers the risk of the two major causes of serious shopping cart-related injuries, namely falls and cart tip overs. For a child who is properly placed in a shopping cart's child seat, the lower location of the child seat 40 in the present invention substantially improves the stability of the shopping cart 10, in addition to lowering the risk of serious injury if the child does fall out of the child seat or if the cart tips over. The relatively high side walls 43 of the child seat 40 prevent a child from leaning out over the sides of the cart 10 which also reduces the risk of the cart tipping over or the child falling out of the seat 40. The side walls 43 also protect the child from being injured if the cart 10 is accidentally hit by another object or if the cart does tip over. Additionally, the relatively high seat back 42 provides an ideal anchor for the optional seat harness 50 compared to the low-profile child seat provided by a more conventional shopping cart.

CONCLUSION, RAMIFICATIONS, AND SCOPE OF INVENTION

In light of the current teaching it is clear that the present invention provides a shopping cart which has a child seat which is inherently safer than the child seats in conventional shopping carts due to the low location of the seat, which reduces the risk of the cart tipping over as well as reducing the risk of serious injuries related to falls from the seat. The present invention is also simple to operate and has external dimensions comparable to conventional shopping carts in widespread use today; therefore, it should be readily adapted to by the general public as well as the retailers which provide such carts. The various parts of the cart may be constructed of any suitable material, which is determined primarily by factors such as cost and durability. Those having skill in the art may recognize additional modifications of elements which may facilitate the application of the invention, but still fall within the scope of the invention. For example, a wide variety of undercarriage designs utilizing additional supports or crossbars may readily be incorporated into the present design. Accordingly, the scope of the invention should be determined not by the embodiments illustrated, but by the appended claims and their legal equivalents.

REFERENCES CITED

U.S. Patents

| U.S. Pat. No. | Issued | Inventor | Title |
| --- | --- | --- | --- |
| 4,108,489 | 8/1978 | Salzman | "Collapsible child seats" |
| 4,204,695 | 5/1980 | Salzman | "Shopping cart child seat" |
| 4,867,464 | 9/1989 | Cook | "Child restraining safety belt or harness" |

-continued

U.S. Patents

| U.S. Pat. No. | Issued | Inventor | Title |
| --- | --- | --- | --- |
| 5,641,200 | 6/1997 | Howell | "Child restraint seat for shopping cart" |
| 5,651,557 | 7/1997 | De Stefano | "Automatic child restraint for shopping carts" |

Other Publications

[1] "Shopping Cart Petition Briefing Package," U.S. Consumer Product Safety Commission, December 1994.

[2] G. A. Smith, MD, DrPH, A. M. Dietrich, MD; C. T. Garcia, MD; and B. J. Shields, MS; "Injuries to Children Related to Shopping Carts," *Pediatrics,* 97: 161–165 (1996).

[3] J. R. Ferrari and C. H. Baldwin, "Promoting Safety Belt Use in Shopping Carts," *Environ. Behav.;* 21:603–619 (1989).

[4] G. A. Smith, MD, DrPH; A. M. Dietrich, MD; C. T. Garcia, MD, and B. J. Shields, MS; "Epidemiology of Shopping Cart-Related Injuries to Children," *Arch. Pediatr. Adolesc. Med.;* 149:1207–1210 (1995).

I claim:

1. A shopping cart comprising:

a) a merchandise-holding basket mounted in a cantilevered fashion on a wheeled undercarriage, said basket having a bottom with a relatively wide forward end and having side walls which angle toward one another away from said forward end, and a hinged gate located between said side walls at the forward end of said basket, b) a child seat located in a relatively low position at the narrow rear end of said basket, and c) a handle for pushing said shopping cart, which may be rotated towards the front end of said basket which thereby aids in the placement and removal of a small child in said child seat as well as providing a means for storing said shopping cart in a nesting manner with other shopping carts of a similar design, whereby said shopping cart provides a substantially safer means for transporting small children in said shopping cart than a shopping cart of a more conventional design.

2. A shopping cart as claimed in claim 1 wherein said child seat is comprised of a bottom which is a portion of the bottom of said basket and the back of said child seat is a wall which separates said child seat from the remainder of said basket which is reserved for holding merchandise.

3. A shopping cart as claimed in claim 1 wherein the sides of said child seat are about as high as said side walls of said basket, thereby substantially preventing a child seated in said child seat from leaning out over the sides of said shopping cart and reducing the risk of injury to said child in the event that the sides of said shopping cart comes in contact with an external object.

4. A shopping cart as claimed in claim 1 wherein the sides of said child seat are located slightly inboard of said side walls of said basket and are approximately parallel to the longitudinal axis of said basket.

5. A shopping cart as claimed in claim 1 wherein the overall width of said basket and said wheeled undercarriage are about the same as conventional shopping carts, such that said shopping cart may replace said conventional shopping carts without requiring any modifications to the retail outlet that employs said conventional shopping carts.

6. A shopping cart as claimed in claim 1 wherein the overall dimensions of said basket and said wheeled undercarriage are about identical to a more conventional shopping cart, such that, in combination with said rotating handle, the means to interchangeably nest said shopping cart with said conventional shopping cart in a relatively compact manner is also provided.

7. A shopping cart as claimed in claim 1 wherein all portions of said handle are wider than the width of said child seat, as defined by the sides of said child seat, thereby providing a means for said rotating handle to operate external of said child seat.

8. A shopping cart as claimed in claim 1 wherein at least at portion of said handle is about the same as the width of the forward end of said basket thereby enabling said handle to rest on top of said side walls of said basket when said handle is in the forward, or nested, position.

9. A shopping cart as claimed in claim 1 further including a seat flap which in combination with said child seat provides a means for converting said child seat into a space for carrying items whenever a child is not placed in said child seat.

10. A shopping cart as claimed in claim 1 further including an adjustable harness or seat belt in said child seat which provides a means for securing a child to said child seat.

11. A shopping cart as claimed in claim 1 further including a T-shaped crossbar across the relatively narrow rear end of said basket which in combination with the bottom of said child seat provides two leg openings for a child placed in said child seat.

12. A shopping cart as claimed in claim 1 further including a pair of cutouts on the bottom of said hinged gate to accommodate a portion of said handle when said shopping cart is in the nested position, thereby providing a means for a more compact storage of said shopping cart with other shopping carts of a similar design.

13. A shopping cart, comprising:
   a) a basket for carrying items having a trapezoidal-shaped bottom with the narrow end being the rear end of said basket, and having a hinged gate at the wide, front end of said basket,
   b) an undercarriage with wheels and members extending upward to support said basket,
   c) a child seat at the narrow, rear end of said basket, and
   d) a handle which, in combination with said basket, provides a means for said handle to rotate when said shopping cart is nested with other carts of a similar design, whereby said shopping cart provides a secure child seat in a relatively low, and thereby more stable and safe, position relative to a conventional shopping cart.

14. A shopping cart as claimed in claim 13 wherein said child seat is comprised of a bottom which is a portion of said trapezoidal-shaped bottom of said basket.

15. A shopping cart as claimed in claim 13 wherein said child seat is comprised of a seat back which is an inclined wall across the width of said basket and is attached at each end to the sides of said basket, whereby the angle of said seat back encourages a child placed in said child seat to lean back in said child seat.

16. A shopping cart as claimed in claim 13 wherein the dimensions of said child seat are designed to specifically accompany averaged-size children between 7 months and five years of age, whereby larger children are substantially prevented from occupying said child seat due to the physical limitations of the size of said child seat.

17. A shopping cart as claimed in claim 13 wherein the overall dimensions of said basket and said undercarriage are about identical to a more conventional shopping cart, such that, in combination with said rotating handle, the means to interchangeably nest said shopping cart with said conventional shopping cart in a relatively compact manner is also provided.

18. A shopping cart as claimed in claim 13 wherein all portions of said handle are wider than the width of said child seat, as defined by the sides of said child seat, thereby providing a means for said rotating handle to operate external of said child seat.

19. A shopping cart as claimed in claim 13 wherein said handle is constructed of high-strength, yet relatively lightweight material, such as high-impact plastic or a fiber-reinforced composite material.

* * * * *